(12) United States Patent
Sakuma et al.

(10) Patent No.: US 10,643,466 B2
(45) Date of Patent: May 5, 2020

(54) VEHICLE SEARCH SYSTEM, VEHICLE SEARCH METHOD, AND VEHICLE USED THEREFOR

(71) Applicant: TOYOTA JIDOSHA KABUSHIKI KAISHA, Toyota-shi, Aichi-ken (JP)

(72) Inventors: Satoru Sakuma, Nagakute (JP); Shuhei Yamamoto, Aichi-ken (JP); Munehiro Kamiya, Anjo (JP); Hideo Hasegawa, Nagoya (JP); Shinji Kurachi, Nagoya (JP); Tomoya Shimizu, Nagoya (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 16/146,230

(22) Filed: Sep. 28, 2018

(65) Prior Publication Data
US 2019/0103020 A1    Apr. 4, 2019

(30) Foreign Application Priority Data

Oct. 2, 2017  (JP) .................................. 2017-192898

(51) Int. Cl.
| | |
|---|---|
| *G08G 1/017* | (2006.01) |
| *H04W 4/44* | (2018.01) |
| *G06K 9/00* | (2006.01) |
| *H04W 4/021* | (2018.01) |
| *G08B 13/196* | (2006.01) |
| *H04W 4/02* | (2018.01) |

(52) U.S. Cl.
CPC ....... *G08G 1/0175* (2013.01); *G06K 9/00791* (2013.01); *G08B 13/19647* (2013.01); *H04W 4/021* (2013.01); *H04W 4/44* (2018.02); *G06K 2209/15* (2013.01); *G06K 2209/23* (2013.01); *H04W 4/02* (2013.01)

(58) Field of Classification Search
CPC ........................... G08G 1/0175; B60R 25/305
See application file for complete search history.

(56) References Cited

U.S. PATENT DOCUMENTS

| | | | |
|---|---|---|---|
| 2005/0137788 A1* | 6/2005 | Kimura ................... | G06F 16/29 701/426 |
| 2006/0115126 A1* | 6/2006 | Watanabe .......... | G06K 9/00362 382/106 |
| 2014/0254879 A1* | 9/2014 | Smith .................... | G06K 9/325 382/105 |
| 2014/0266580 A1* | 9/2014 | Lopez ................ | G07C 9/00571 340/5.6 |

(Continued)

FOREIGN PATENT DOCUMENTS

| | | |
|---|---|---|
| JP | H08-030892 A | 2/1996 |
| JP | 2014-016875 A | 1/2014 |

*Primary Examiner* — Fabricio R Murillo Garcia
(74) *Attorney, Agent, or Firm* — Hunton Andrews Kurth LLP

(57) ABSTRACT

A vehicle search system includes a vehicle incorporating a vehicle-mounted camera and a server configured to communicate with the vehicle. The server transmits search target vehicle data for specifying a search target vehicle to the vehicle. The vehicle is configured to (a) store the search target vehicle data from the server and (b) transmit, when a vehicle detected by the vehicle-mounted camera falls under search target vehicles included in the search target vehicle data, detection information on the detected vehicle to the server.

7 Claims, 5 Drawing Sheets

(56) References Cited

U.S. PATENT DOCUMENTS

| | | | | |
|---|---|---|---|---|
| 2015/0124099 A1* | 5/2015 | Evanitsky | ........... | G06K 9/00785 |
| | | | | 348/149 |
| 2015/0312400 A1* | 10/2015 | Hansen | ............. | H04M 1/72547 |
| | | | | 455/414.1 |
| 2015/0332591 A1* | 11/2015 | Fligler | ................. | G08G 1/0175 |
| | | | | 340/943 |

* cited by examiner

| No. | VEHICLE IDENTIFIER | SEARCH AREA |
|---|---|---|
| 1 | NERIMA 303 TA 1234 | KANTO AREA |
| 2 | NAGOYA 583 SO 5678 | TOKAI AREA |
| 3 | KYOTO 383 MA 1357 | KANSAI AREA |
| 4 | KYOTO C A 2467 | KYOTO, OSAKA |

VEHICLE SEARCH SYSTEM, VEHICLE SEARCH METHOD, AND VEHICLE USED THEREFOR

This nonprovisional application is based on Japanese Patent Application No. 2017-192898 filed with the Japan Patent Office on Oct. 2, 2017, the entire contents of which are hereby incorporated by reference.

BACKGROUND

Field

The present disclosure relates to a vehicle search system, a vehicle search method, and a vehicle used therefor, and more particularly to a technique of detecting a search target vehicle with a running vehicle.

Description of the Background Art

More and more vehicles incorporate a camera for video recording of circumstances at the time of an accident or the like. A technique of identifying a vehicle in video data obtained with such a vehicle-mounted camera has been known.

Japanese Patent Laying-Open No. 2014-016875 discloses a system configured to transmit to a server, identification plate information of a preceding vehicle obtained from video shot with a vehicle-mounted camera at the time of detection of harsh braking of a user's vehicle and to have the server diagnose driving characteristics of a driver of the preceding vehicle based on the number of times of application of harsh braking.

Japanese Patent Laying-Open No. 8-30892 discloses a traffic monitoring system configured to calculate a time period required for traveling between two different locations or to detect a specific vehicle such as a crime-related vehicle or a stolen vehicle by checking vehicle identification number data, based on information transmitted from a plurality of vehicles each incorporating a vehicle-mounted camera and a vehicle identification number recognition device. The vehicle identification number recognition device recognizes a vehicle identification number of an oncoming vehicle or a preceding vehicle in video from the camera.

SUMMARY

The system disclosed in Japanese Patent Laying-Open No. 2014-016875 or No. 8-30892 diagnoses driving characteristics or detects a crime-related vehicle by transmitting identification plate data of a preceding vehicle or an oncoming vehicle obtained from the vehicle-mounted camera to a base station together with time and having the base station analyze the data transmitted from the camera.

Analysis of data by the base station in search for a specific vehicle as described in Japanese Patent Laying-Open No. 8-30892 involves transmission from each vehicle of data on vehicles other than the search target vehicle. Therefore, communication traffic between the vehicles and the base station increases and an amount of data processed in the base station also increases. In particular, vehicle-mounted cameras have widely been used in recent years and more and more vehicles are able to communicate with the base station. Therefore, further increase in amount of data between vehicles and base stations is expected.

The present disclosure was made to solve such problems, and an object thereof is to enable searching for a target vehicle with a smaller amount of communication data in a vehicle search system including a vehicle incorporating a vehicle-mounted camera.

A vehicle search system according to the present disclosure includes a vehicle incorporating a camera and a server configured to communicate with the vehicle. The server is configured to transmit vehicle data for specifying a search target vehicle to the vehicle. The vehicle is configured to (a) store the vehicle data from the server and (b) transmit, when a vehicle detected by the camera falls under search target vehicles included in the vehicle data, detection information on the detected vehicle to the server.

In the vehicle search system in the present disclosure, each vehicle can determine whether or not a detected vehicle falls under search target vehicles based on search target vehicle data transmitted from the server, and information on the detected vehicle is transmitted from the vehicle to the server when the search target vehicle is detected. Therefore, processing load imposed on the server and communication traffic between vehicles and the server can be less than in an approach to transmit all information on all vehicles detected by the vehicle-mounted cameras to the server and to have the server determine whether or not the detected vehicle falls under search target vehicles.

The vehicle data includes identification plate information of the search target vehicles. The vehicle is configured to determine whether or not the detected vehicle falls under the search target vehicles by comparing identification plate information of the detected vehicle obtained based on an image from the camera with the identification plate information included in the vehicle data.

According to such a configuration, a search target vehicle can be detected based on identification plate information of vehicles. The identification plate information is specific to a vehicle and can accurately be read from data shot with the camera with the techniques known in recent years. Therefore, accuracy in detection of a search target vehicle can be enhanced.

The vehicle data includes area information specifying a search area for the search target vehicles. The vehicle is configured to perform search processing for searching for the search target vehicles when a position of the vehicle is within the search area specified by the area information.

According to such a configuration, search processing in each vehicle is performed only within a search area set for a search target vehicle. Therefore, load imposed by search processing in each vehicle can be lessened and communication traffic between vehicles and the server can be reduced.

The vehicle is configured to transmit search completion information including a range of search in the search processing and time of search to the server when the position of the vehicle is out of the search area and when no search target vehicle was detected while the search processing was performed within the search area.

According to such a configuration, even when no search target vehicle was detected in processing for searching a search area, the server can recognize information on results of search of the search area (a range of search and time of search). The server can thus narrow down the area of search for search target vehicles.

The server includes a display configured to show progress of search for the search target vehicles based on the detection information and the search completion information transmitted from the vehicle.

According to such a configuration, progress of search for search target vehicles can visually be known on a side of the server. Therefore, tracking of search target vehicles and narrowing down of a search area are facilitated.

The detection information includes vehicle identification information, detection time information, and detection position information of the detected search target vehicle.

The detection information including such information is transmitted from the vehicle to the server so that the server can specify a search target vehicle and know how the search target vehicle travels.

A vehicle according to another aspect of the present disclosure is configured to communicate with a server and to detect a search target vehicle. The vehicle includes a camera and a control device. The control device is configured to (a) store vehicle data for specifying a search target vehicle, the vehicle data being transmitted from the server, (b) determine whether or not a vehicle detected by the camera falls under search target vehicles included in the vehicle data, and (c) transmit detection information on the detected vehicle to the server when the detected vehicle falls under the search target vehicles.

A method according to yet another aspect of the present disclosure is a vehicle search method of detecting a search target vehicle with a vehicle incorporating a camera. The vehicle is configured to communicate with a server. The method includes (a) transmitting vehicle data for specifying a search target vehicle from the server to the vehicle, (b) determining in the vehicle, whether or not a nearby vehicle detected by the camera falls under search target vehicles included in the vehicle data, and (c) transmitting detection information on the detected vehicle from the vehicle to the server when the detected vehicle falls under the search target vehicles.

According to the present disclosure, in the system for searching for a vehicle with the use of a vehicle-mounted camera, when information on search target vehicles is transmitted from a server to vehicles and a vehicle detected by the camera falls under the search target vehicles, information on the detected vehicle is transmitted from the vehicles to the server. The vehicles thus determine whether or not a detected vehicle falls under search target vehicles so that data on vehicles other than the search target vehicles is no longer transmitted from the vehicles to the server. Therefore, an amount of data communicated between the vehicles and the server in searching for a specific vehicle can be reduced.

The foregoing and other objects, features, aspects and advantages of the present disclosure will become more apparent from the following detailed description of the present disclosure when taken in conjunction with the accompanying drawings.

DESCRIPTION OF THE PREFERRED EMBODIMENTS

Figure 1:
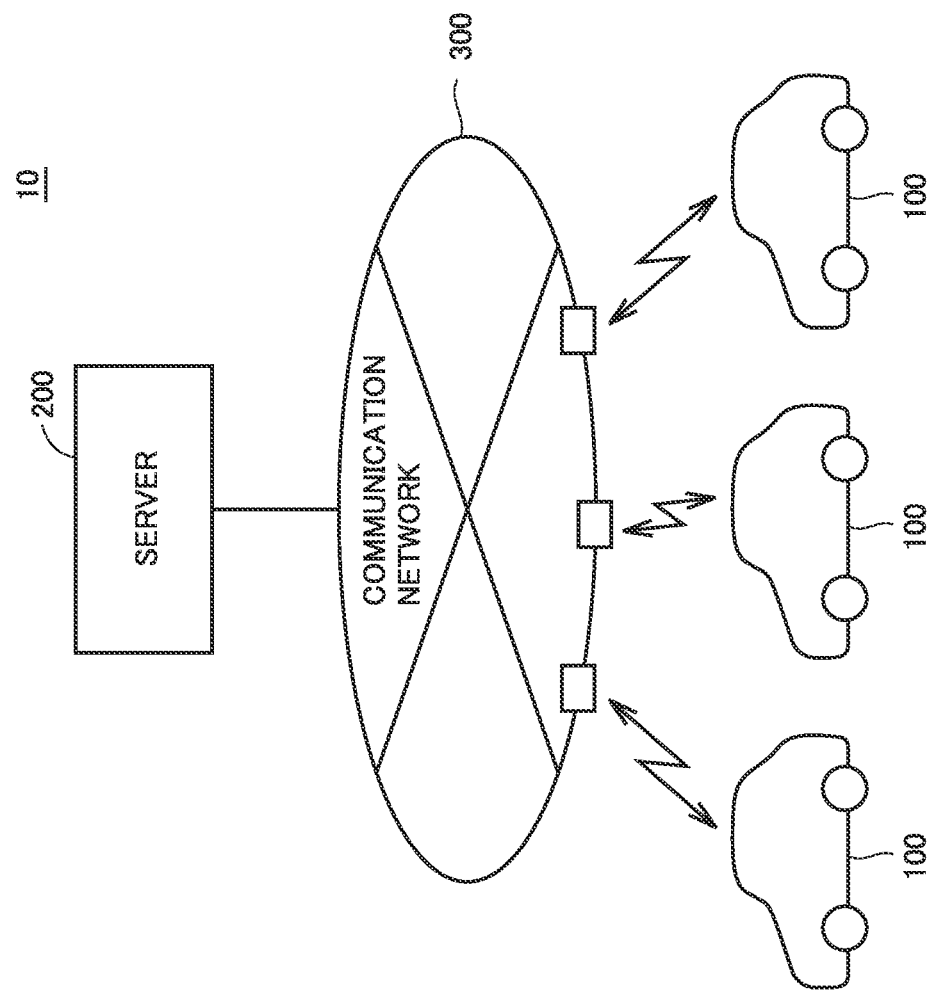
FIG. 1 is a diagram schematically showing an overall configuration of a vehicle search system according to the present embodiment.

An embodiment of the present disclosure will be described in detail below with reference to the drawings. The same or corresponding elements in the drawings have the same reference characters allotted and description thereof will not be repeated.

FIG. 1 is a schematic diagram of an overall configuration of a vehicle search system 10 according to the present embodiment. Referring to FIG. 1, vehicle search system 10 includes a plurality of vehicles 100 and a server 200. Vehicles 100 and server 200 are configured to communicate through a communication network 300 such as the Internet or telephone lines. Each vehicle 100 is configured to transmit and receive information through wireless communication with communication network 300. Vehicles 100 and server 200 may be able to directly communicate with each other.

As will be described later with reference to FIG. 2, vehicle search system 10 searches for a specific vehicle such as a crime-related vehicle or a stolen vehicle based on video data obtained from a camera mounted on each vehicle 100.

Figure 2:
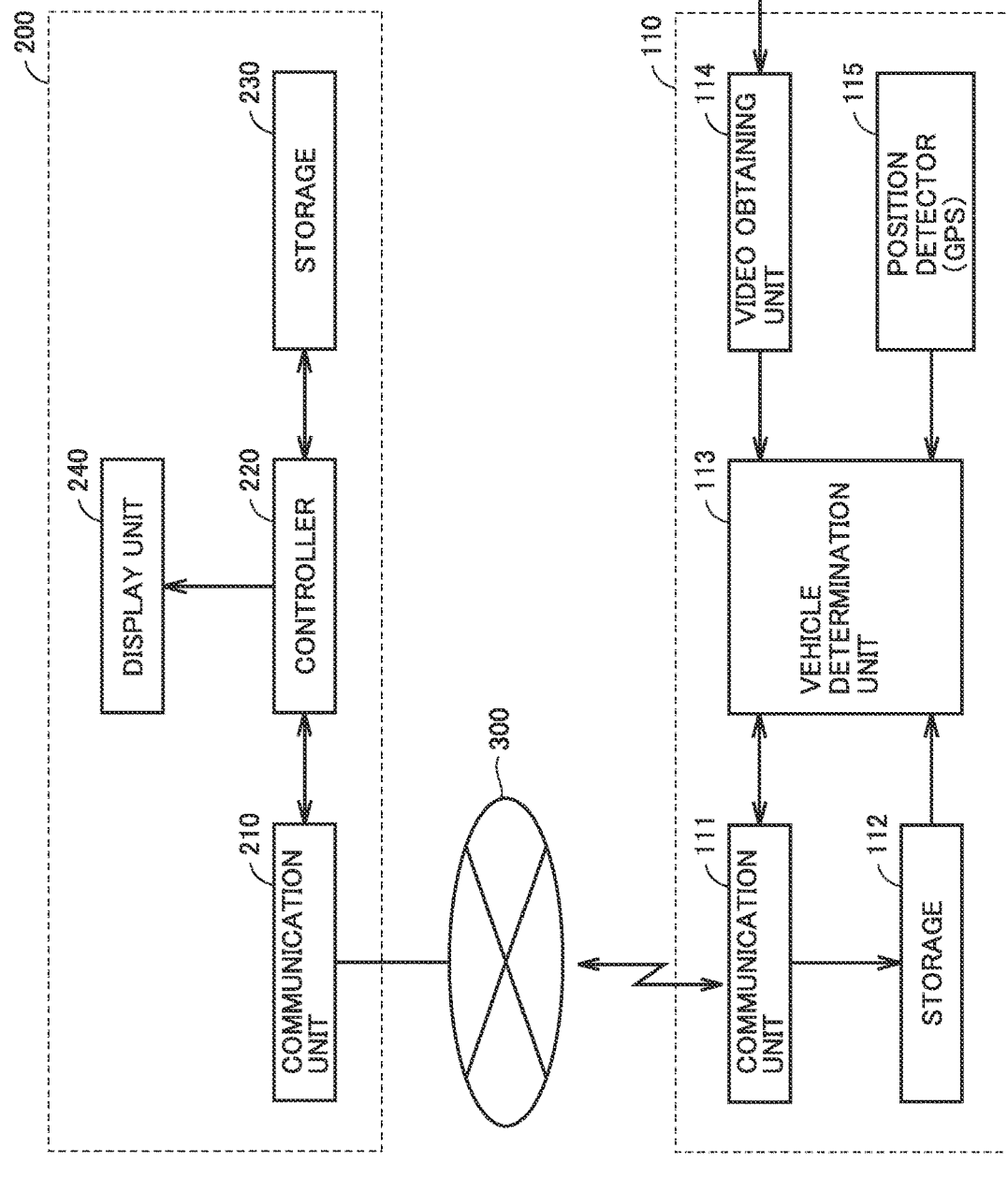
FIG. 2 is a block diagram for illustrating details of a vehicle and a server in FIG. 1.

FIG. 2 is a block diagram for illustrating details of vehicle 100 and server 200 in FIG. 1. Referring to FIG. 2, vehicle 100 includes a control device 110 and a vehicle-mounted camera 120. Control device 110 includes a communication unit 111, a storage 112, a vehicle determination unit 113, a video obtaining unit 114, and a position detector 115.

Communication unit 111 is a communication interface between vehicle 100 and communication network 300. Vehicle 100 transmits and receives information to and from server 200 through communication unit 111. As will be described later, communication unit 111 receives information on search target vehicles (which is also referred to as "search target vehicle data" below) transmitted from server 200 and has storage 112 store the received search target vehicle data. Communication unit 111 transmits information on a specific vehicle detected by vehicle determination unit 113 to server 200.

Vehicle-mounted camera 120 is implemented, for example, by a charge coupled device (CCD) camera and attached to a front portion and/or a rear portion of the vehicle. Vehicle-mounted camera 120 shoots video of a preceding vehicle, an oncoming vehicle, or a following vehicle (which is also referred to as a "preceding vehicle or the like" below). Data resulting from shooting by vehicle-mounted camera 120 is transmitted to video obtaining unit 114.

Video obtaining unit 114 receives shooting data from vehicle-mounted camera 120. Video obtaining unit 114 analyzes the received shooting data and recognizes characters on an identification plate of the preceding vehicle or the like. Known various techniques are applicable as techniques of recognizing an identification plate from data resulting from shooting by the camera. For example, when a bar code or a QR Code® (a two-dimensional bar code) having identification information specifying a vehicle embedded is attached to a vehicle body, video obtaining unit 114 may recognize identification information of a vehicle by decoding the code obtained by vehicle-mounted camera 120.

Video obtaining unit 114 transmits information on the recognized identification plate to vehicle determination unit 113. The obtained image data is stored in storage 112 as necessary.

Position detector 115 is mounted, for example, on a navigation device (not shown) and obtains absolute position information of vehicle 100 by using a global positioning system (GPS). Position detector 115 outputs obtained position information to vehicle determination unit 113.

Vehicle determination unit 113 compares an identifier (representatively identification plate information) for specifying a vehicle included in the search target vehicle data stored in storage 112 with identification plate information of a vehicle recognized by video obtaining unit 114, and determines whether or not a detected vehicle shot with vehicle-mounted camera 120 falls under search target vehicles transmitted from server 200. When the detected vehicle falls under the search target vehicles, vehicle determination unit 113 transmits information on the detected vehicle to server 200. Information on the detected vehicle includes identification plate information of the detected vehicle, information on time of shooting and a position, and data on a shot image.

Server 200 includes a communication unit 210, a controller 220, a storage 230, and a display unit 240.

Communication unit 210 is a communication interface between server 200 and communication network 300, and transmits and receives information to and from communication network 300. Communication unit 210 can also directly communicate with vehicle 100.

Controller 220 includes a central processing unit (CPU), a storage device such as a memory, and an input and output buffer, none of which is shown, and controls entire vehicle search system 10 in a centralized manner. Controller 220 transmits information on search target vehicles stored in storage 230 to each vehicle 100 through communication unit 210. Controller 220 receives detection information transmitted from each vehicle 100 and has storage 230 store the detection information.

The information on the search target vehicles stored in storage 230 is, for example, information on vehicles used for a crime or stolen vehicles.

Display unit 240 is implemented, for example, by a liquid crystal panel and shows a result of detection from each vehicle 100.

In a conventional system configured to detect a specific vehicle based on an image shot with a vehicle-mounted camera, a server has mainly analyzed shooting data and performed matching with a search target vehicle. In this case, however, information on all vehicles detected by vehicles should be transmitted to the server. Since information transmitted to the server covers many vehicles not of interest of search, communication traffic between the vehicles and the server can be more than necessary. In particular, vehicle-mounted cameras have widely been used in recent years and more and more vehicles are able to obtain video data, and resolution of the cameras has also improved. Therefore, data communication traffic between the vehicles and the server can further increase and processing capability of the server may also have to significantly be improved.

In the present embodiment, an approach to transmit information on search target vehicles from the server to vehicles and to have each vehicle perform processing for analysis of an image shot with the camera and matching with the search target vehicles is adopted. By doing so, processing which has conventionally been performed by the server can be distributed to individual vehicles so that processing load imposed on the server can be lessened and communication traffic between the server and the vehicles can be reduced.

Figures 3, 4:
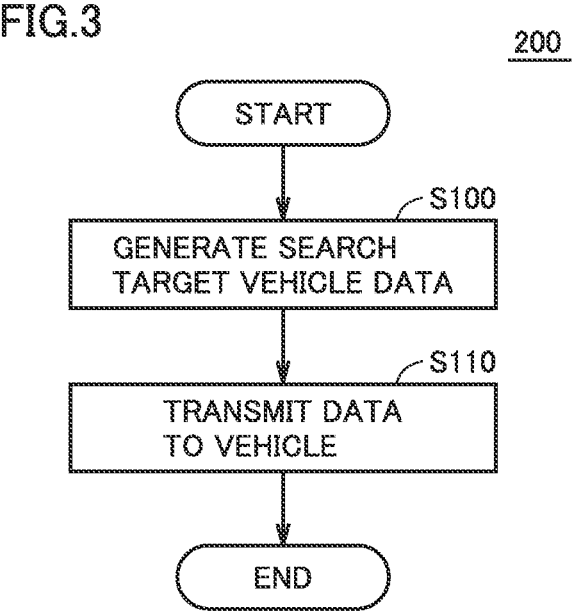
FIG. 3 is a flowchart for illustrating control carried out in the server in the present embodiment.
FIG. 4 is a diagram showing exemplary search target vehicle data transmitted from the server.

FIG. 3 is a flowchart for illustrating control carried out in the server in the present embodiment. Referring to FIG. 3, controller 220 of server 200 creates in step (which will be abbreviated as S below) 100, search target vehicle data to be transmitted to each vehicle 100 based on information stored in storage 230. Thereafter, controller 220 transmits the created search target vehicle data to vehicle 100 which should perform search processing.

FIG. 4 is a diagram showing exemplary search target vehicle data. The search target vehicle data includes vehicle identification information and search area information. Vehicle identification information is information for specifying a vehicle to be searched for and it is representatively identification plate information. Alternatively, when control device 110 of vehicle 100 is equipped with a function to specify a vehicle type from video obtained by vehicle-mounted camera 120, information showing characteristics of an appearance of a vehicle such as a vehicle type of a search target vehicle and a color of a vehicle body may be included as vehicle identification information.

Search area information is information showing an area of search for each vehicle to be searched for. When a position of each vehicle 100 is within a search area of interest, each vehicle 100 performs processing for searching for a search target vehicle of interest. By thus limiting the search area, load imposed by search processing performed by each vehicle 100 can be lessened. Communication traffic between server 200 and each vehicle 100 can also be reduced.

Search area information may be in accordance, for example, with an administrative district such as a state, a prefecture, a county, or a city or with a regional area defined as a plurality of administrative districts. The identification plate information includes an administrative district in which search target vehicles have been registered, and many vehicles are highly likely to run in the vicinity of the administrative district in which the search target vehicles have been registered. Setting of a search area based on an administrative district can be made not only based on identification plate information but also based on an administrative district including a position where a search target vehicle has most recently been detected. Alternatively, a search area may be specified based on a distance from a specific position (for example, a 50-km radius). The search area does not have to be fixed but may be modified as appropriate in accordance with progress of search.

Search target vehicle data may be transmitted to all vehicles which can perform search processing or to vehicles which are running in a specific area. When search target vehicle data is transmitted to vehicles in a specific area, data included in the search target vehicle data may be limited to information on search target vehicles to be searched for in that area. By thus limiting vehicles 100 to perform searching and search target vehicles, processing load imposed on each vehicle 100 and server 200 and communication traffic between vehicles 100 and server 200 can further be lessened.

Figure 5:
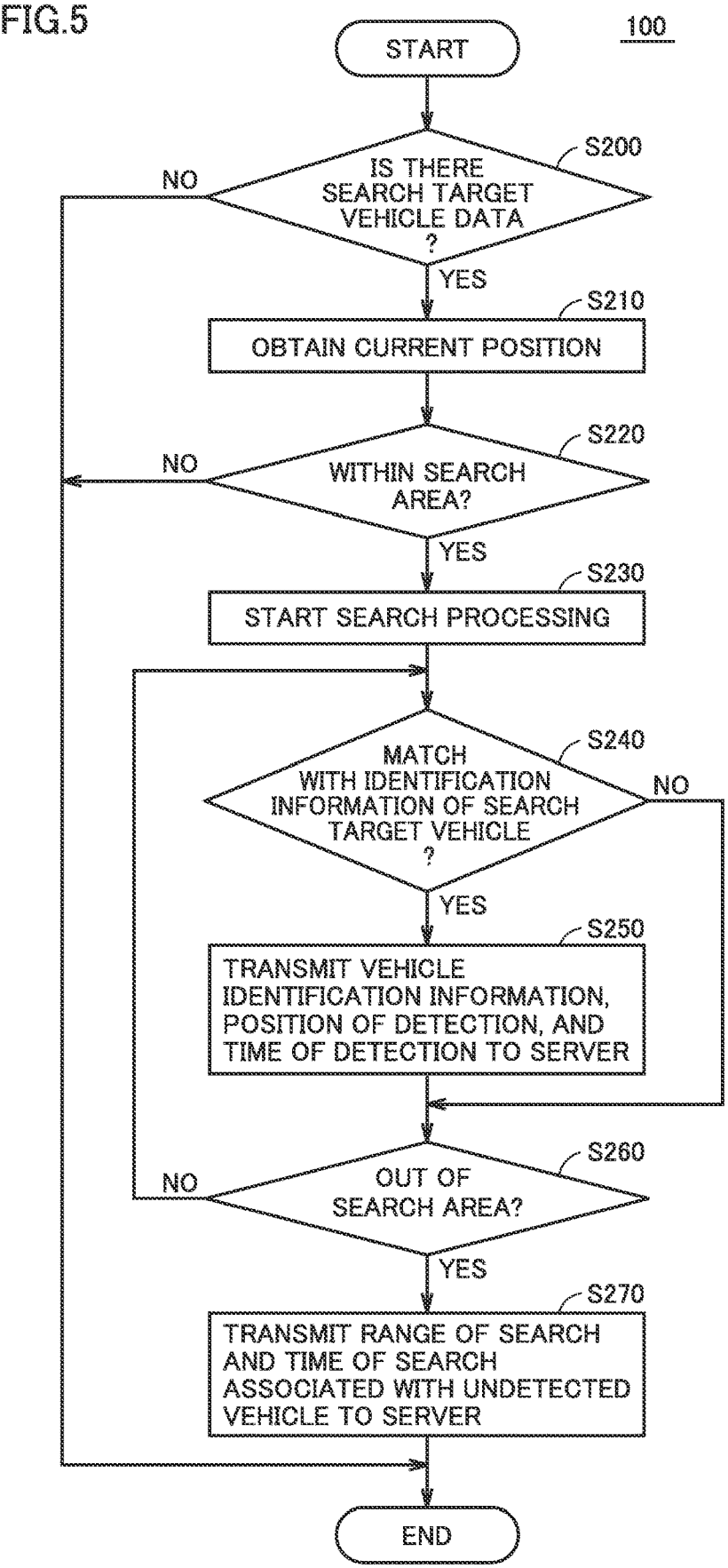
FIG. 5 is a flowchart for illustrating details of control carried out in the vehicle in the present embodiment.

FIG. 5 is a flowchart for illustrating details of control carried out by control device 110 in vehicle 100 in the present embodiment. Processing shown in FIG. 5 may regularly be performed every prescribed period or when a specific condition is satisfied. The processing shown in FIG. 5 may be performed by a hardware circuit in the control device or performed in its entirety or in part by software (a program) executed by the CPU.

Referring to FIG. 5, control device 110 determines in S200 whether or not there is search target vehicle data transmitted from server 200. When there is no search target vehicle data (NO in S200), server 200 has given no instruction for search. Therefore, control device 110 skips subsequent processing and the process ends.

When there is search target vehicle data (YES in S200), the process proceeds to S210 and control device 110 obtains from position detector 115, a current position of vehicle 100. Control device 110 determines in S220 whether or not the current position is within a search area included in the search target vehicle data. When the current position is out of the search area for all search target vehicles in the search target vehicle data (NO in S220), there is no vehicle to be searched for. Therefore, control device 110 skips subsequent processing and the process ends.

When the current position is within the search area for any search target vehicle (YES in S220), the process proceeds to S230 and control device 110 starts processing for searching for the search target vehicle. Specifically, control device 110 analyzes in video obtaining unit 114, video obtained by vehicle-mounted camera 120.

Control device 110 determines in vehicle determination unit 113, whether or not vehicle identification information on a detected vehicle obtained by analysis of the video by video obtaining unit 114 matches with vehicle identification information of a specific vehicle in the search target vehicle data transmitted from server 200 (S240).

When the vehicle identification information of the detected vehicle matches with the vehicle identification information in the search target vehicle data (YES in S240), the process proceeds to S250 and control device 110 transmits the vehicle identification information specifying the detected vehicle and information on a position and time of detection of the detected vehicle as "detection information" to server 200. Video data of the detected vehicle may together be transmitted. Once the detected vehicle is determined as the search target vehicle and detection information is transmitted to server 200, detection information on the same detected vehicle does not have to be transmitted to the server for a prescribed period. For example, when a preceding vehicle is a search target vehicle and vehicle 100 follows the search target vehicle, the detection information is prevented from being successively transmitted.

When the vehicle identification information of the detected vehicle does not match with any vehicle identification information in the search target vehicle data (NO in S240), the processing in S250 is skipped and the process proceeds to S260. In S260, control device 110 determines whether or not a position of vehicle 100 is out of the search area. When vehicle 100 is still within the search area for any search target vehicle (NO in S260), the process returns to S240 and control device 110 continues search processing.

When a position of vehicle 100 is out of the search area (YES in S260), the process proceeds to S270. When all search target vehicles which should be detected within the search area in the search target vehicle data are detected as well, the position of vehicle 100 may be regarded as being out of the search area and the process may proceed to S270.

In S270, control device 110 transmits to server 200 as "search completion information," information indicating that no search target vehicle among the search target vehicles to be searched for within the search area could be detected at the time of search in a range of search in the search processing, and quits the process.

Figure 6:
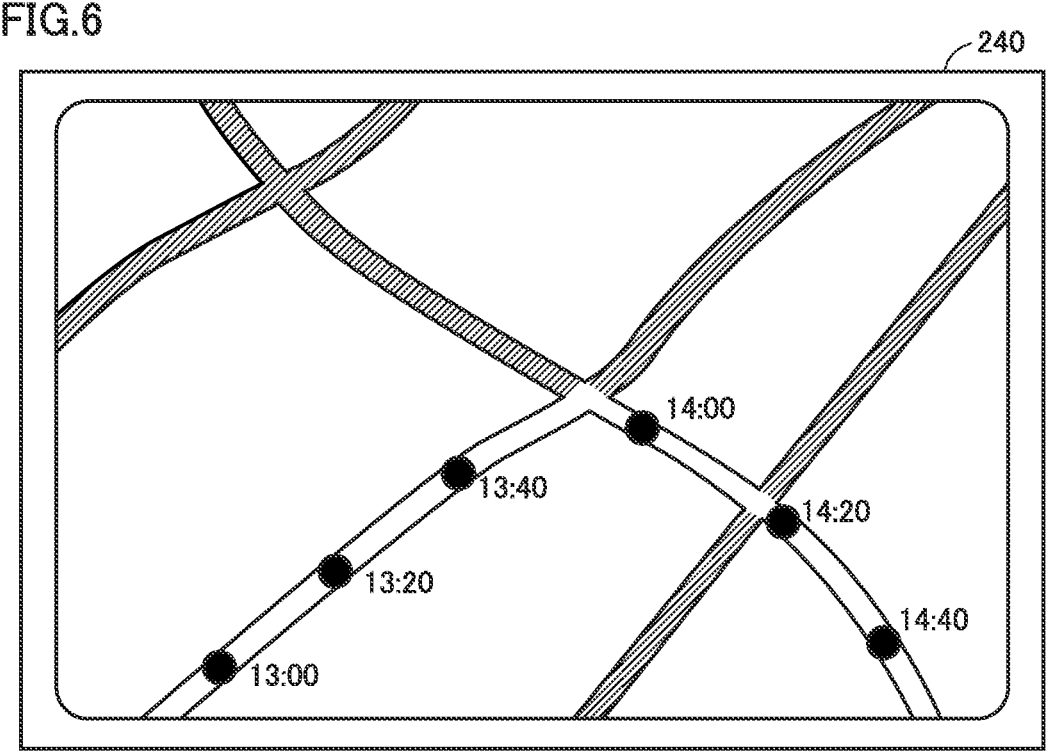
FIG. 6 is a diagram showing exemplary representation on a display unit of the server.

Server 200 shows a position where a specific search target vehicle has been detected together with time of detection on a map on display unit 240 as in FIG. 6, based on the detection information on the search target vehicle and the search completion information transmitted from each vehicle 100. Thus, the specific search target vehicle can be tracked over time. A range of search for search target vehicles can be narrowed down by showing a range where search target vehicles are undetected on the map.

Under the control in accordance with the processing above, in the vehicle search system configured to search for a vehicle of interest by using information from vehicles each incorporating a vehicle-mounted camera, each vehicle can determine whether or not a detected vehicle falls under search target vehicles based on search target vehicle data transmitted from the server and stored in advance in the storage, and detection information is transmitted from the vehicle to the server when a search target vehicle is detected. Therefore, as compared with a conventional approach to transmit all information on all vehicles detected by the vehicle-mounted cameras and to determine whether or not a detected vehicle falls under search target vehicles on the server side, processing load imposed on the server can be lessened and communication traffic between the vehicles and the server can be reduced.

Since search processing is performed in each vehicle only within a search area set for each search target vehicle, load imposed by search processing in each vehicle can be lessened.

The flowchart shown in FIG. 5 illustrates an example in which when a search target vehicle is detected, detection information is transmitted to the server in real time, and when no search target vehicle is detected, search completion information is transmitted at a time point when a vehicle performing search is out of the search area. Transmission to the server, however, may be performed at prescribed time intervals (for example, at ten-minute intervals) or every prescribed section during search processing. In this case, a vehicle transmits to the server at prescribed time intervals or every prescribed section, whether or not each of search target vehicles having a search area including a current position of the vehicle has been detected.

In search processing in each vehicle, preferably, a user (driver) of a vehicle is not notified of the fact that search processing is being performed or of search target vehicle data transmitted from the server, in order to prevent the user of each vehicle from recognizing that a preceding vehicle or the like of the user's vehicle is a stolen vehicle or a crime-related vehicle and that the user's vehicle is designated as the search target vehicle.

Though an embodiment of the present disclosure has been described, it should be understood that the embodiment disclosed herein is illustrative and non-restrictive in every respect. The scope of the present disclosure is defined by the terms of the claims and is intended to include any modifications within the scope and meaning equivalent to the terms of the claims.

What is claimed is:

1. A vehicle search system for detecting a search target vehicle comprising:
    a vehicle incorporating a camera; and
    a server configured to communicate with the vehicle incorporating the camera,
    the server being configured to transmit vehicle data for specifying the search target vehicle to the vehicle incorporating the camera,
    the vehicle incorporating the camera being configured to store the vehicle data from the server, and
        transmit, when a vehicle detected by the camera falls under search target vehicle included in the vehicle data, detection information on the detected vehicle to the server,
    the vehicle data including area information specifying a search area for the search target vehicle, the vehicle incorporating the camera being configured to perform search processing for searching for the search target vehicle when the vehicle incorporating the camera is travelling within the search area specified by the area information, the vehicle incorporating the camera being configured not to perform search processing for searching for the search target vehicle when the vehicle incorporating the camera is traveling outside the search area specified by the area information.

2. The vehicle search system according to claim 1, wherein
the vehicle data includes identification plate information of the search target vehicle, and the vehicle incorporating the camera is configured to determine whether the detected vehicle falls under the search target vehicle by comparing identification plate information of the detected vehicle obtained based on an image from the camera with the identification plate information included in the vehicle data.

3. The vehicle search system according to claim 1, wherein
the vehicle incorporating the camera is configured to transmit search completion information including a range searched in the search processing and time of search to the server when the position of the vehicle incorporating the camera is out of the search area and when no search target vehicle was detected while the search processing was performed within the search area.

4. The vehicle search system according to claim 3, wherein
the server includes a display configured to show progress of search for the search target vehicle based on the detection information and the search completion information transmitted from the vehicle incorporating the camera.

5. The vehicle search system according to claim 1, wherein
the detection information includes vehicle identification information, detection time information, and detection position information of the detected vehicle.

6. A vehicle configured to communicate with a server and detect a search target vehicle, the vehicle comprising:
a camera; and
a control device, the control device being configured to
store vehicle data for specifying the search target vehicle, the vehicle data being transmitted from the server,
determine whether a vehicle detected by the camera falls under a search target vehicle included in the vehicle data,
transmit detection information on the detected vehicle to the server when the detected vehicle falls under the search target vehicle, the vehicle data including area information specifying a search area for the search target vehicle, the control device being configured to perform search processing for searching for the search target vehicle when the vehicle including the camera is travelling within the search area specified by the area information, the control device being configured not to perform search processing for searching for the search target vehicle when the vehicle including the camera is travelling outside the search area specified by the area information.

7. A vehicle search method of detecting a search target vehicle with a vehicle incorporating a camera, the vehicle being configured to communicate with a server, the vehicle search method comprising:
transmitting vehicle data for specifying the search target vehicle from the server to the vehicle, the vehicle data including area information specifying a search area for the search target vehicle;
determining in the vehicle incorporating the camera, whether a nearby vehicle detected by the camera falls under a search target vehicle included in the vehicle data,
transmitting detection information on the detected vehicle from the vehicle incorporating the camera to the server when the detected vehicle falls under the search target vehicle,
performing, in the vehicle incorporating the camera, search processing for searching for the search target vehicle when the vehicle incorporating the camera is travelling within the search area specified by the area information, and not performing, in the vehicle incorporating the camera, search processing for searching for the search target vehicle when the vehicle incorporating the camera is travelling outside the search area specified by the area information.

* * * * *